(No Model.)

J. W. CLOUD.
CAR AXLE BOX.

No. 370,449. Patented Sept. 27, 1887.

Attest
H. W. Hare Powel
Joshua Matlack, Jr.

Inventor
John W. Cloud
by his attorney
Francis T. Chambers

UNITED STATES PATENT OFFICE.

JOHN W. CLOUD, OF BUFFALO, NEW YORK.

CAR-AXLE BOX.

SPECIFICATION forming part of Letters Patent No. 370,449, dated September 27, 1887.

Application filed August 3, 1887. Serial No. 246,016. (No model.)

*To all whom it may concern:*

Be it known that I, JOHN W. CLOUD, of Buffalo, county of Erie, and State of New York, a citizen of the United States, have invented a new and useful Improved Journal-Box, of which the following is a true and exact description, reference being had to the accompanying drawings, which form a part of this specification.

My invention relates particularly to railway axle-boxes; but is also applicable to journal-boxes and oil-boxes used with any kind of shafting.

The object of my invention is to close the end or ends of the box through which the axle or shaft passes in such a way as to prevent dust from getting into the oil-box, and also to prevent the escape of the oil therefrom.

Figure 1:
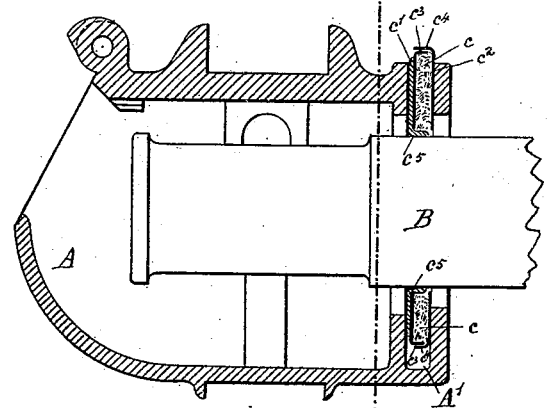
Figure 2:
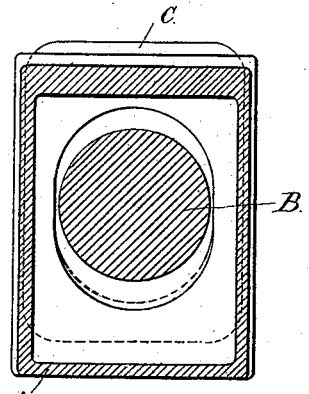
Figure 3:
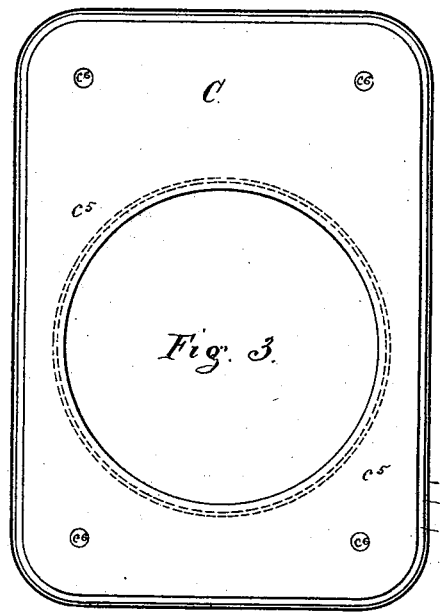
Figure 4:
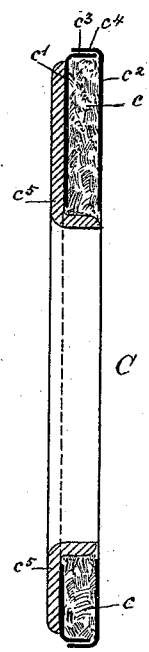
Figure 5:
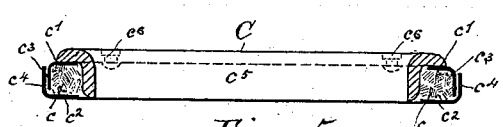

Reference being now had to the drawings which illustrate my invention in what I believe to be its best form and as applied to a car journal-box, Figure 1 is a central longitudinal section through an axle-box and axle having my improvements. Fig. 2 is a cross-section on the line $x\ x$ of Fig. 1. Fig. 3 is a front view of my improved device out of connection with an axle-box. Fig. 4 is a central vertical section through said device, and Fig. 5 a similar central horizontal section.

A is the axle-box, which is of usual construction, save that in the end through which the axle B passes a chamber, A', is formed open at its top.

C is my improved dust-guard and oil-retainer. It is made up of the following parts: first, what may be called a "washer," $c$, of hair, felt, or other elastic extensible material, cut or formed of proper size, and having its center cut away so as to permit the axle B to pass through it. This washer is held between two plates, $c'\ c^2$, which also have holes formed in them to permit the axle to pass through them. Preferably these plates are made of sheet metal and provided with flanges $c^3\ c^4$, one of which, $c^3$, is adapted to pass inside of the other, $c^4$, forming with the plates $c'\ c^2$ a case or box for the washer $c$; but there should be no friction between the flanges $c^3\ c^4$, and care should be taken that they do not grip each other.

$c^5$ is a flanged washer, which has its flat surface along one of the plates $c^2$ or $c^3$, and its flange passing inside of the axle-hole and lying against the edge of the expansible washer $c$. This flange is made to about fit the axle, and the holes left in the packing $c$ and plates $c'\ c^2$ are of about the size of the axle plus the thickness of the flange of the washer $c^5$. I prefer to make the flanged washer $c^5$ of leather; but of course other material or fabrics used in similar positions may be substituted for it.

It will usually be found convenient to secure the washer $c^5$ to one of the plates $c'$ or $c^2$, for which purpose rivets may be used, as shown at $c^6\ c^6$, &c.

The way in which my invention is to be used will be readily seen from the drawings. The guard C, having been made up as described, is inserted in the chamber A' through its top opening. It is made of such breadth as to be compressed somewhat between the walls of chamber A', and this compression forces the packing-washer $c$ to project inward against the flange of washer $c^5$, causing it to fit against the axle B. Its flat side of course, being inward, fits snugly against the inner wall of chamber A', and the escape of oil or entrance of dust is thus prevented.

The dust-guard C is free to move in the box A' as the axle-bearing wears away, and there is therefore no strain or undue friction upon the box or axle.

Having now described my invention, what I claim as new, and desire to secure by Letters Patent, is—

1. As a dust-guard and leak-preventer for axle-boxes, the device C, consisting of an elastic packing-washer held between two plates and a flanged washer secured upon the outside of one plate, and having its annular flange passing through the holes in said plate and resting against the elastic packing, all substantially as and for the purpose shown and described.

2. As a dust-guard and leak-preventer for axle-boxes, the device C, consisting of an elastic packing-washer held between two flanged plates, said plates being adapted to form a loosely-fitting box or case for the elastic packing-washer, and a flanged washer secured upon the outside of one plate, and having its annular flange passing through the holes in said plate and resting against the elastic packing, all substantially as and for the purpose shown and described.

3. As a dust-guard and leak-preventer for axle-boxes, the chamber A, in combination with the device C, consisting of an elastic packing-washer held between two plates and a flanged washer secured upon the outside of one plate, and having its annular flange passing through the holes in said plate and resting against the elastic packing, all substantially as and for the purpose shown and described.

4. As a dust-guard and leak-preventer for axle-boxes, the chamber A, in combination with the device C, consisting of an elastic packing-washer held between two flanged plates, said plates being adapted to form a loosely-fitting box or case for the elastic packing-washer, and a flanged washer secured upon the outside of one plate, and having its annular flange passing through the holes in said plate and resting against the elastic packing, all substantially as and for the purpose shown and described.

JNO. W. CLOUD.

Witnesses:
A. G. THOMASON,
W. E. J. STORY.